United States Patent [19]
Lorris

[11] Patent Number: 6,144,281
[45] Date of Patent: Nov. 7, 2000

[54] FLEXIBLE LEAD ELECTROMAGNETIC COIL ASSEMBLY

[75] Inventor: Mark S. Lorris, Grand Rapids, Mich.

[73] Assignee: Smiths Industries Aerospace & Defense Systems, Inc., Grand Rapids, Mich.

[21] Appl. No.: 09/091,137

[22] PCT Filed: Dec. 5, 1996

[86] PCT No.: PCT/US96/20262

§ 371 Date: Sep. 11, 1998

§ 102(e) Date: Sep. 11, 1998

[87] PCT Pub. No.: WO97/21231

PCT Pub. Date: Jun. 12, 1997

Related U.S. Application Data

[60] Provisional application No. 60/007,985, Dec. 5, 1995.

[51] Int. Cl.[7] .................................................. H01F 5/00
[52] U.S. Cl. ....................... 336/200; 336/225; 336/232; 310/208; 310/254
[58] Field of Search .................... 336/200, 232, 336/225, 180, 183; 310/180, 208, 254; 257/531

[56] References Cited

U.S. PATENT DOCUMENTS 3,587,019  6/1971  Bull et al. .......................... 336/200
4,645,961  2/1987  Malasky.
4,883,981  11/1989  Gerfast.
4,962,329  10/1990  Fujita et al..
5,276,421  1/1994  Boitard ................................ 336/180
5,572,179  11/1996  Ito et al. ............................. 336/200

FOREIGN PATENT DOCUMENTS

0 030 008  10/1981  European Pat. Off..
2 314 569  7/1997  France.
  700458  12/1953  United Kingdom.
  795469  5/1958  United Kingdom.

Primary Examiner—Lincoln Donovan
Assistant Examiner—Tuyen Nguyen
Attorney, Agent, or Firm—Varnum, Riddering, Schmidt & Howlett LLP

[57] ABSTRACT

A plurality of sensing coils are formed by spiral coil electrical conductor sections deposited on a flexible substrate which is formed into a cylindrical form about a central axis. The conductor sections are spaced apart by a distance equivalent to one-quarter of the circumferencial length of the cylindrical form, to define four separate coils spaced apart by 90 degrees. Coil sections are deposited in the register on opposite sides of the substrate and interconnected through the substrate. The coil pattern may be repeated in adjacent areas of the substrate to form a multi-layered coil when a number of turns of the substrate are wound around the central axis.

9 Claims, 5 Drawing Sheets

FLEXIBLE LEAD ELECTROMAGNETIC COIL ASSEMBLY

This application claims benefit of Provisional Application 60/007,985 filed Dec. 5, 1995.

BACKGROUND OF THE INVENTION

1. Field of the Invention

The invention relates to a device for generating an electric field and more particularly to such devices of small physical dimension producing a comparatively high-strength electric field.

2. Prior Art

Figure 1:
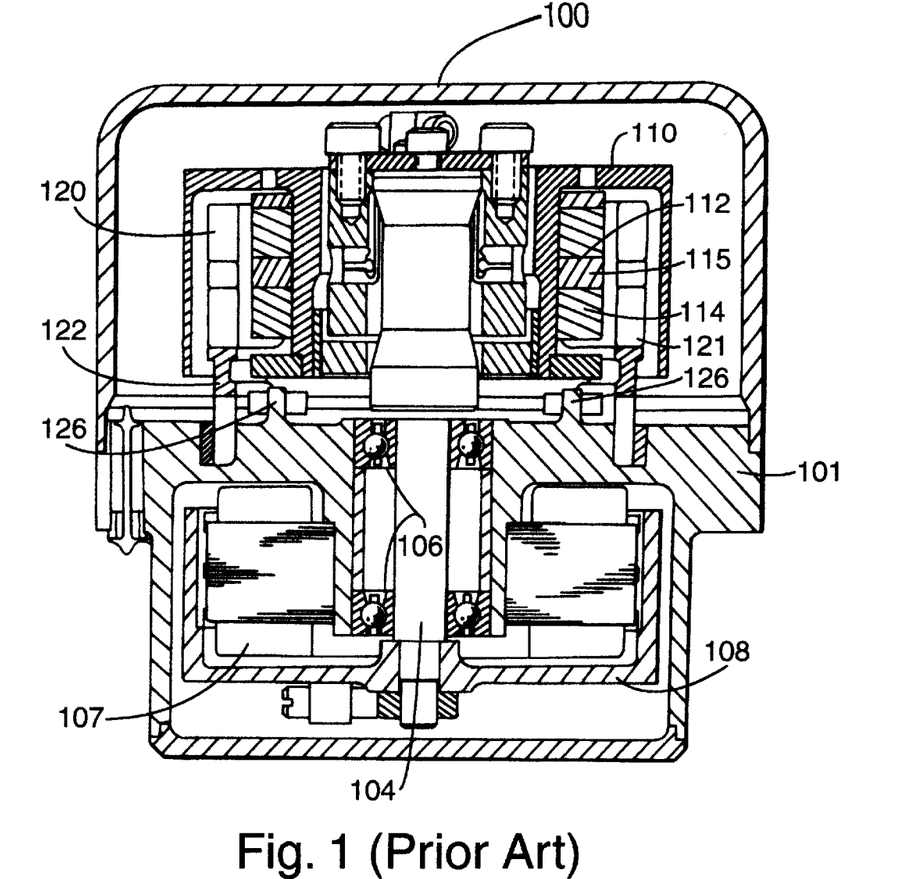
FIG. 1 is a cross-sectional representation of a prior art gyroscope apparatus.

In certain applications, physically small electrical devices are needed to produce a relatively strong electric field. Once such application is in navigation gyroscopes, particularly in a small navigation gyroscope referred to as a Dry Tuned-Rotor Gyroscope (DTG). On particular type of DTG is described in the paper entitled Two-Axis Dry Tuned-Rotor Gyroscopes: Design and Technology; William M. Mansour and Corrado Lacchini, The American Institute of Aeronautics and Astronautics, Inc., Volume 16, No. 3, May–June 1993. The DTG is a two-degree-of-freedom sensor of angular velocity about two mutually orthogonal axes. This class of instruments has been adopted for a number of control applications, most notably in the navigation of ships, aircrafts, and other vehicles. The basic structure of one prior art DTG is shown in FIG. 1. The unit 100 shown in FIG. 1 comprises a housing assembly having a base 101 and a cover 102. The base 101 supports a spin shaft 104 on a pair of ball bearings 106. Mounted on the base 101 is a stator 107 forming part of a hysteresis motor. A hysteresis ring 108 is supported on the spin shaft. Flexibly supported on the shaft 104 is a rotor 110. A pair of permanent magnets 112, 114, which are vertically separated by means of a spacer 115, are mounted on rotor 110. The rotor 110 is flexibly mounted on the spin shaft 104 and is movable with respect to the spin shaft 104 about axes in a horizontal plane extending perpendicular to the plane of the cross section shown in FIG. 1. Torquer coils 120, 121 are mounted on a beryllium ring 122 supported on the base 101 and surrounding the magnets 112, 114. A pair of pick-offs 126 is mounted on the base 101. The pick-offs are well-known sensors coils producing an electrical output signal which varies with a variation in the spacing between the pick-offs and the rotor 110. It will be apparent from FIG. 1 that an angular displacement of the rotor 110 about an axis perpendicular to the plane of the cross section of FIG. 1 will result in an increase in the spacing between one of the two pick-offs 126 and the rotor 110 and a decrease in spacing between the other of the two pick-offs 126 and rotor 110. Electrical signals produced by the pick-offs are indicative of the magnitude of the angular displacement and are employed to produce a current in the torquer coils 120, 121. The torquer coils produce a magnetic field in the rotor 110 imparting a torque to the rotor 110 tending to return the rotor to a position such that the distances between the two pick-offs 126 and the rotor 110 are again equal.

The permanent magnets 112, 114 are ring magnets extending circumferentially within the rotor 110. The unit 100 comprises four separate pick-offs coils and four separate torquer coils. One set of pick-offs and one set of torquer coils are disposed along a horizontally extending x axis and equidistant from a vertical axis and are referred to as the x pick-offs and the x torquer coils, respectively. Similarly, a set of pick-offs, referred to as y pick-offs, and a set of torquer coils, referred to as y torquer coils, are disposed along a horizontally extending y axis, extending perpendicularly to the x axis, and spaced equidistant from the vertical axis. It will be apparent that only one of the sets of pick-offs and torquer coils is shown in FIG. 1. The other pick-offs and torquer coils are disposed at 90° angles from those shown in FIG. 1. In operation, signals from the x and y pick-offs are 0 in the absence of angular displacement of the rotor 110 relative to the spin shaft 104. When such a displacement occurs about the y axis, the gap between one of the x pick-offs and the rotor will increase and the gap between the other of the x pick-offs and the rotor will decrease. To cancel the difference between the gaps, a torque is applied about the x axis to force the rotor to precess about the y axes. Accordingly, a signal derived from the x pick-offs is used to apply a current to the y torquer coils until the spacing between the rotor and the two x pick-offs is again equal.

Prior art torquer coils consist of several hundred turns of fine wire coated with an insulated coating. The coils of wire are formed or "blocked" into a special shape and bonded to maintain that shape. Two lead wires must be attached to each coil. Each of the four coils must then be affixed with an adhesive to the beryllium ring or the like in a precise location which varies from unit to unit due to the lack of precision inherent in the blocking operation. The eight lead wires are then soldered to a circuit board. It will be appreciated that the rate at which the rotor is returned to the level position, once it has experienced an angular displacement, is directly proportional to the magnetic force generated by the torquer coils. The force or moment applied by the torquer coil is a function of the number of turns of the torquer coil, the curved length of the coil (i.e., the length of the coil along the circumference of the beryllium ring), as well as the current in the coil. A disadvantage of the prior art arrangement is that the curved length of the coil is limited by the circumference of the beryllium ring which is preferably kept as small as reasonably possible since the diameter of the ring affects the total size of the device. Furthermore, the straight portion of the wound coil is necessarily relatively short since a significant portion of the overall dimension of the coil is consumed by the curved portion of the wound coil. Additionally, spacing between adjacent coils is necessary for electrical connections. Thus, even though each coil theoretically may occupy 90° of the circumference of the ring, the straight portion of the coil, which determines curved length, may occupy only about 60°. To be useful in high-speed missiles and the like, the gyro must be of small size and must correct at a very high rate in order to be able to detect attitude changes of the vehicle at a sufficiently fast rate. To obtain a high rate of correction, a rapidly varying, high-strength magnetic field is required. However, the amount of current that can be supplied to the small size coil is limited due to excessive heat which is generated in the wire.

SUMMARY OF THE INVENTION

These and other problems of the prior art are solved in accordance with the present invention by means of a torquer coil constructed of a flex lead circuit material in which the conductors forming the field generating coil are etched with a photochemical process on an epoxy resin substrate and covered with a vapor-deposited insulation. In accordance with one aspect of the invention, a plurality of spiral coil nested conductor circuit sections are formed on a longitudinally extending strip of the flexible material and the flexible material is wound to form a cylinder in which the centers of every other one of a set of nested conductors are separated by 180°. Thus, a sequence of four such nested conductors, when properly placed, form two sets of opposing coils. In one embodiment of the invention, the number of nested conductors arranged on the flexible material comprises an integral number which is a multiple of four and the flexible conductors are wound in such a manner that nested conductors which are spaced apart by three other nested conductors form a set of adjacent layers of a coil. Each set of adjacent layers is spaced apart by 90° from circumferentially adjacent sets of layers. The adjacent layers of each set are electrically interconnected to form a plurality of coils along perpendicularly extending axes. In this manner, multiple sets of nested conductors, etched on a longitudinally extending substrate, are arranged to form a single multiple layer coil at each of four positions surrounding the circumference of the device.

In one preferred embodiment, nested wire circuits forming layers of a coil are provided on both sides of a single strip of the flexible material and are interconnected through the material to form adjacent layers of a coil.

In accordance with one aspect of the invention, the flexible material may comprise a thin layer of a heat conducting metal, such as copper or the like, which acts as a heat sink conducting heat away from the conductors, thereby allowing for a greater magnitude of current to be applied to the circuit and providing increased torque.

In accordance with another aspect of the invention, the nested circuits are each formed with right angle corners in order to obtain an increased curved length of the coil. Advantageously, the right angle corners avoid the loss in curved length of the coil due to the curvature of traditionally wound coils of conductive wires. A further advantage of the present arrangement is that the coils may be placed substantially immediately adjacent one another around the circumference since no additional space is needed for connections between the coils. Advantageously, a coil arrangement in accordance with this invention uses less space and is considerably more cost effective than wound coils using wire conductors.

BRIEF DESCRIPTION OF THE DRAWING

An embodiment of the invention is described in the following paragraphs with reference to the drawing in which.

DETAILED DESCRIPTION

Figure 2:
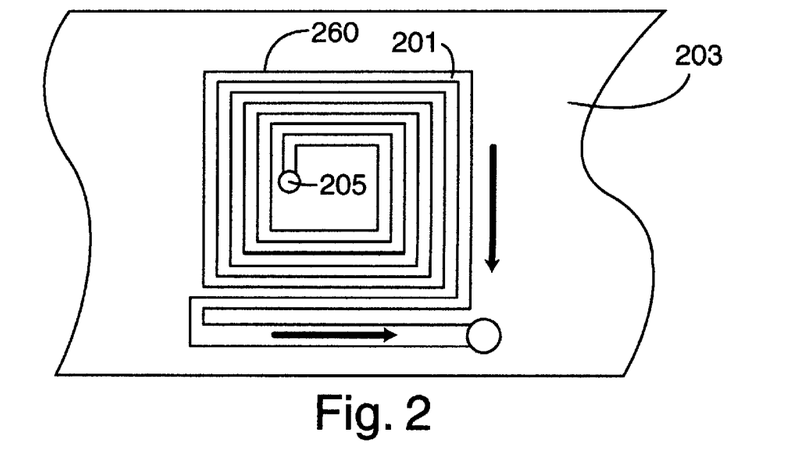
FIG. 2 is an enlarged diagrammatic representation of a nested conductor forming a single layer of a coil.

FIG. 2 is a top view of a single nested circuit comprising a strip of conductive material 201 in the form of a spiral coil nested conductor circuit section 260, deposited on a substrate 203 which may be a well-known flex lead circuit material with a copper conductor or the like etched onto the substrate. The conductor has one end 205 which, by means of an opening in the substrate known as a "via", may be connected to an adjacent nested circuit. The adjacent circuit may be either deposited on the opposite side of the substrate or deposited on another section of the substrate which, when the substrate is formed into a cylindrical form, is in alignment with the section to form a next layer of a coil.

Figure 3:
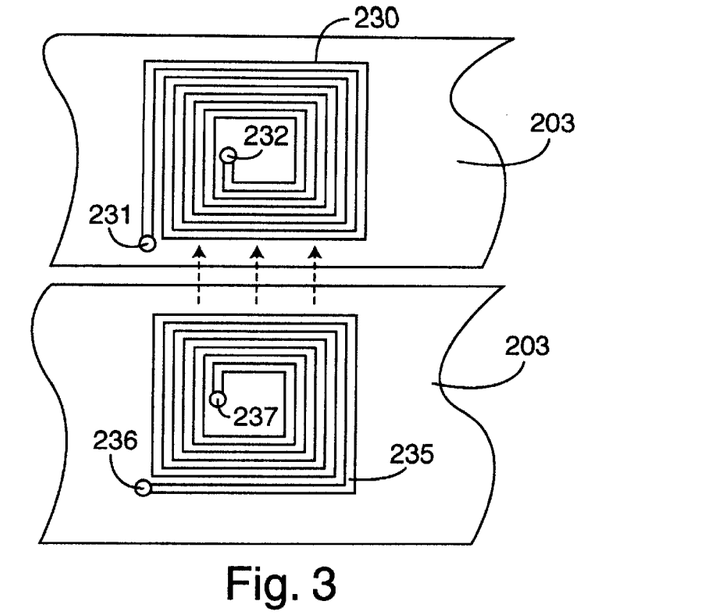
FIG. 3 is a diagrammatic representation of a double-sided flexible substrate with nested conductors on each side of the substrate forming two layers of a coil.
Figure 4:
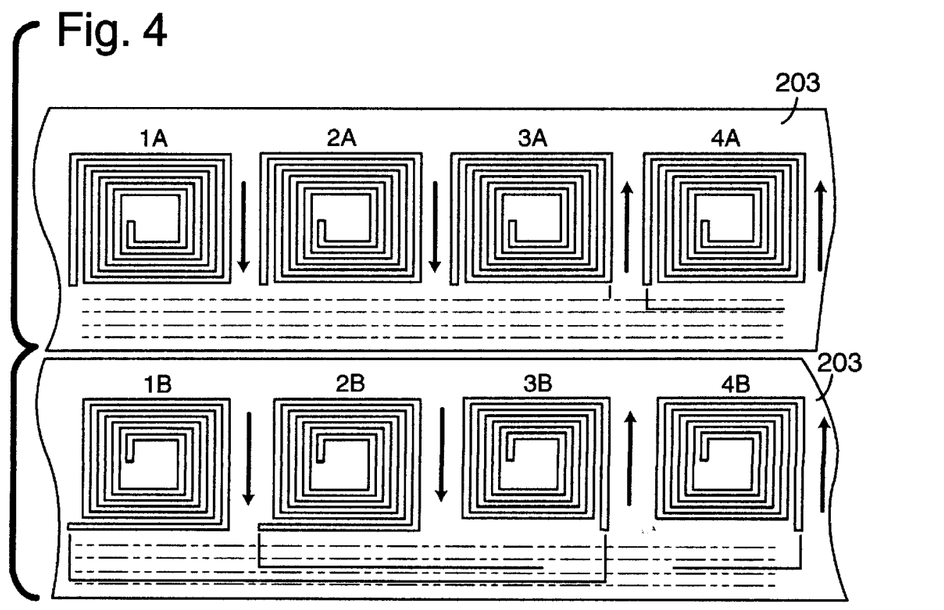
FIGS. 4 through 8 are diagrammatic representations of a plurality of nested circuits on a single flexible substrate which may be interconnected and formed into a cylindrical configuration to define four, multi-layer, spaced apart coils.
Figure 5:
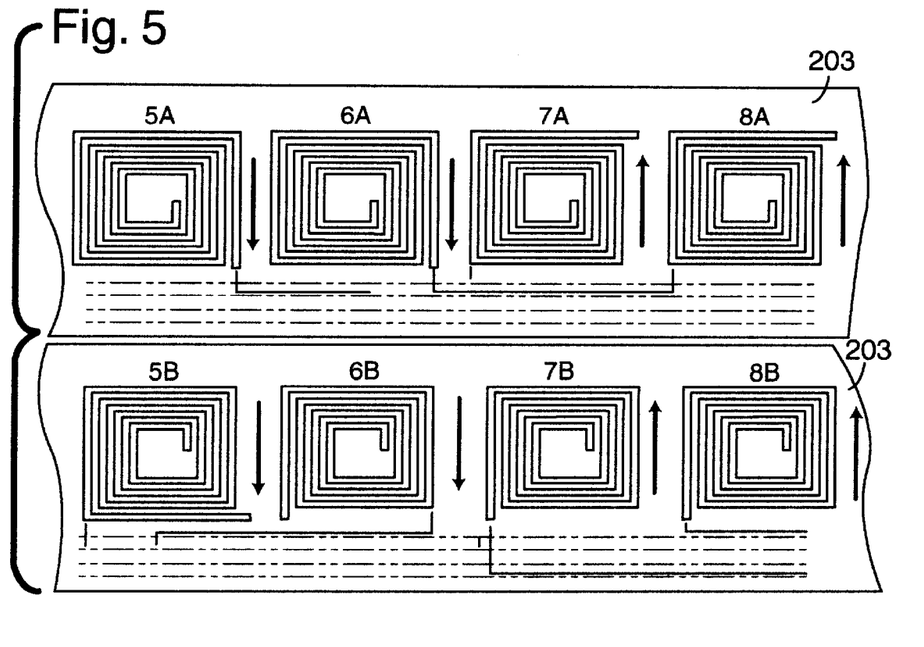
Figure 6:
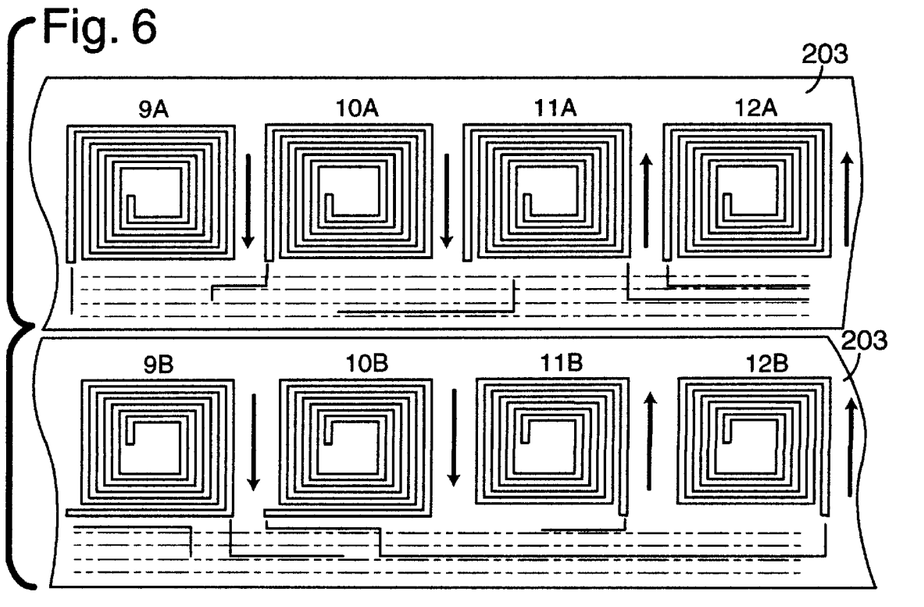
Figure 7:
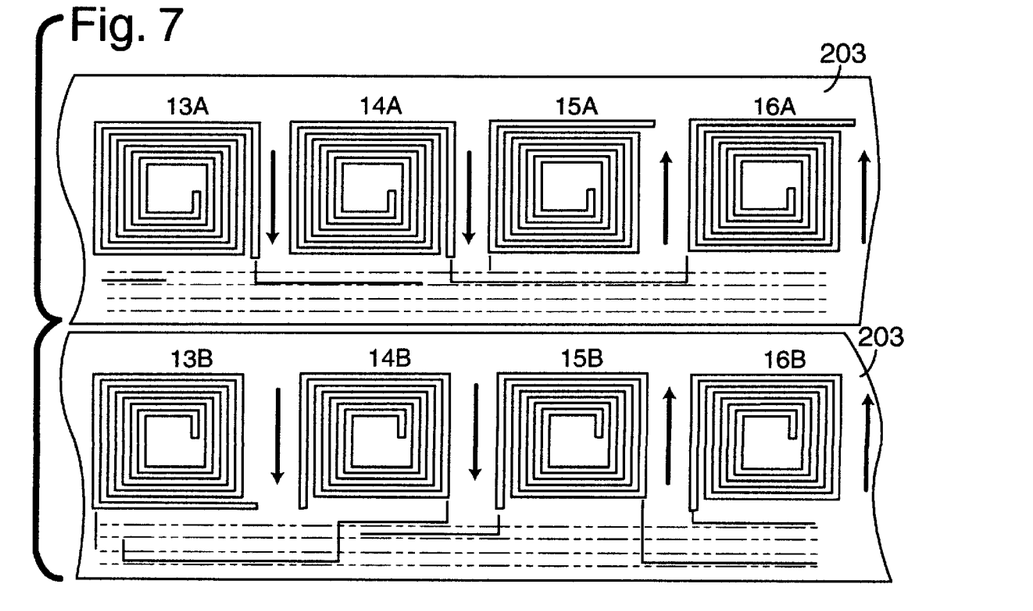

In a preferred embodiment of the invention, a nested circuit is deposited on both sides of the flexible substrate. FIG. 3 is a top view of a nested circuit configuration 230 on one side of the substrate, referred to herein as the top side of the substrate. A second nested circuit configuration 235 is deposited on the other side of the substrate. Via 231 of circuit 230 and via 236 of circuit 235 are respectively connected to a current source and a current sink. Vias 232 and 237 are interconnected through the substrate to form a continuous circuit. The conductors are preferably arranged on opposite sides of the substrate in such a fashion that conductor sections on opposite sides of the substrate are in register with each other. This is shown further in FIG. 4 described below. The complementary nested conductors, i.e, arranged in register on opposite sides of the substrate, do not necessarily have the same electrical length but the overall electrical length is the same for each complementary set.

FIGS. 4 through 7 form a schematic representation of an arrangement of 16 complementary sets of nested conductors. In each case, the drawing shows a top view of the nested conductor on one side of the substrate as well as the top view of the nested conductor on the reverse side of the substrate, as viewed from the one side of the substrate. The nested conductor sets are numbered 1A, 1B through 16A, 16B. A specific pattern is indicated for each of the nested conductors of sets 1A, 1B through 8A, 8B. Each pair of nested conductors forms two layers of a coil and, since there are four torquer coils in the gyroscope of FIG. 1, each set of 8 complementary nested conductors represents four layers for each of the four coils. As stated in connection with FIG. 3, the conductors of the complementary nested circuits A and B of each pair are arranged in register with each other on opposite sides of the substrate. The substrate with the sets of nested conductors is formed into a multi-layer cylindrical unit in such a manner that for each complete turn of the substrate one complementary pair of the nested circuits is aligned with one torquer coil position. Thus, in one complete turn of the substrate, two layers are added to each of the four coils. For the sake of this description, the side of the substrate facing outwardly from the center of the gyroscope arrangement is referred to as the top side and the side of the substrate facing inwardly is referred as the bottom side. In accordance with that convention, nested circuits 1A, 2A, etc. are formed on the top side of the substrate and nested circuits 1B, 2B, etc. are formed on the bottom side of the substrate. It will be apparent that in such a configuration, the nested circuit 5B will be placed in alignment with nested circuit 1A. Nested circuit 5B is preferably arranged such that when placed adjacent to the nested circuit 1A the conductor sections of nested circuit 5B fall between conductor sections of the nested circuit 1A. Advantageously, such a nesting arrangement provides volumetric efficiency by reducing the overall thickness of multiple turns of the substrate in forming the multi-layer cylindrical unit. In a similar fashion, the nested circuit 6B is nested in circuit 2A, circuit 7B is nested in circuit 3A, and circuit 8B is nested in circuit 4A. Similarly, after a subsequent complete turn of the substrate, circuits 9B through 12B are nested in circuits 5A through 8, respectively. The specific patterns of nested circuits 1A through 8A are repeated in nested circuits 9A through 16A. Similarly, the patterns of nested circuits 1B through 8B are repeated in 9B through 16B. As indicated earlier, the nested circuit patterns 1A, 1B through 8A, 8B represent four layers of each of four separate coils. Similarly, nested circuits 9A, 9B through 16A, 16B represent four additional layers for each coil. The patterns of circuits 1A, 1B through 8A, 8B may be repeated as many times as required to obtain the desired number of layers in each coil.

Figure 8:
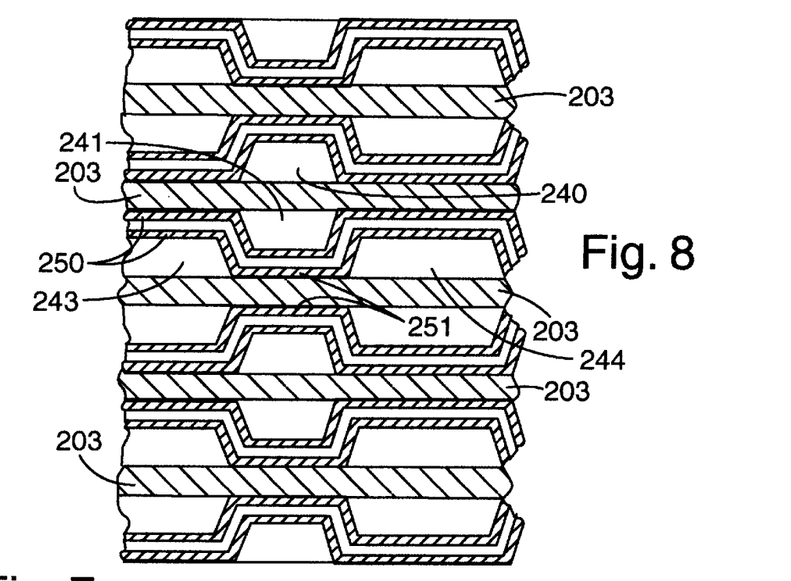

FIG. 8 is a cross-sectional view of a portion of a plurality of layers of the substrate 200 wound a number of times around a cylindrical form. FIG. 8 shows the deposit of conductors, e.g., conductors 240 and 241, on opposite sides of the substrate 200 and in register with each other. FIG. 8 further shows the nesting arrangement in which a conductor on one substrate, e.g., conductor 241, is disposed in a spacing between adjacent conductors, e.g., 243, 244, allowing nesting of conductors of one nested circuit in a spacing between conductors of a nested circuit on an adjacent section of the substrate. FIG. 8 further shows an insulating layer 250 on each side of each section of the substrate which covers the conductor sections, such as 241, 243, and 244, to assure proper insulation between adjacent conductors. Space between adjacent layers of the substrate not occupied by conductors, such as the space indicated at 251, is filled with a resin.

Figure 9:
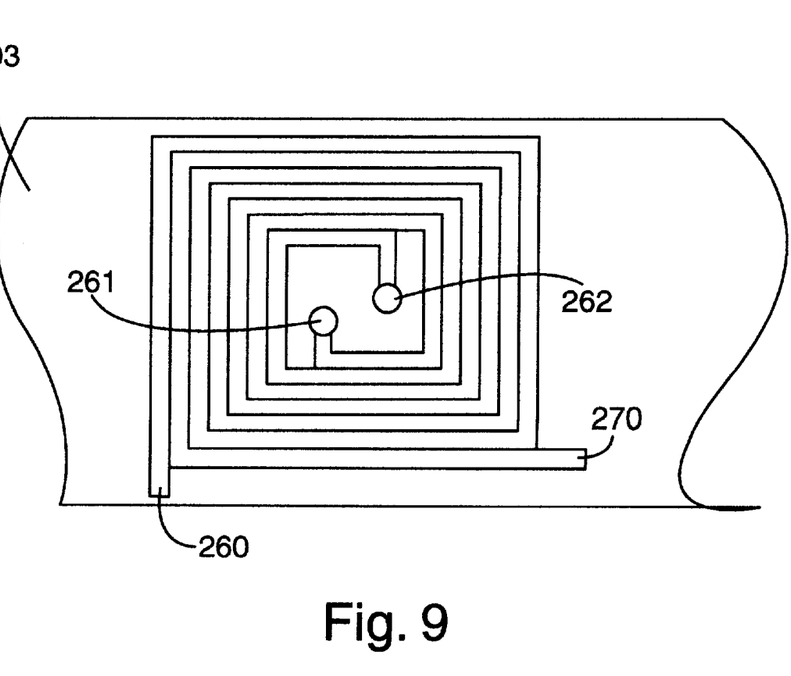
FIG. 9 is a top view of a flexible substrate formed into a cylindrical configuration.

FIG. 9 is a schematic representation of a nested circuit 260 disposed on an outer surface of one layer of the substrate, with the substrate wound in the cylindrical form, and another circuit 270 disposed on the inner surface of a next layer of the substrate. The nested circuit 260 represents one of the patterns of nested circuits, e.g., 1A of the circuits represented in FIGS. 4 through 7, and conductor 270 represents another circuit with a specific pattern, e.g., the pattern of nested circuit 5B, of one of the circuits of the arrangement of FIGS. 4 through 7.

Figure 10:
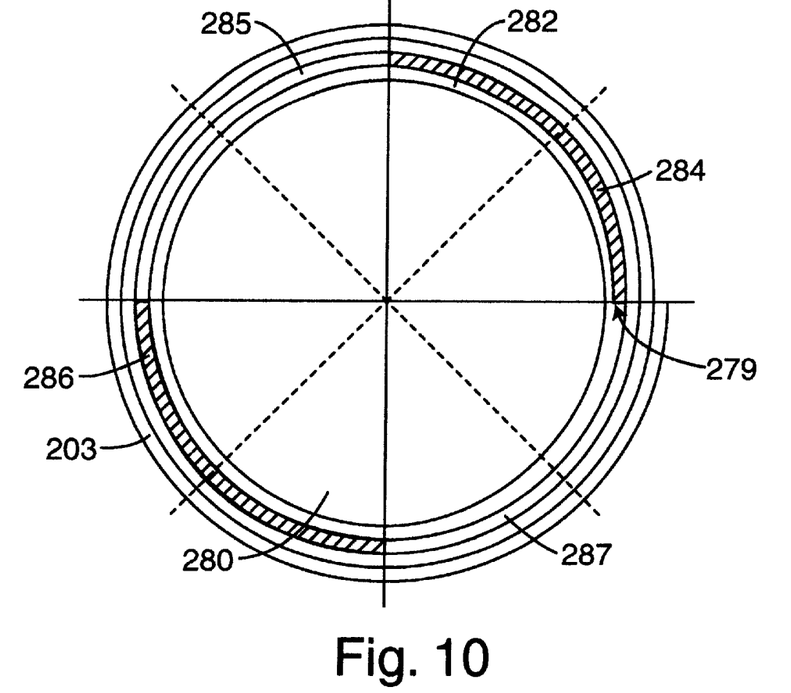
FIG. 10 is a cross-sectional view of a metallic substrate covered with an insulating layer and conductors deposited on both sides of the substrate.

FIG. 10 is a top view of a cylinder formed by winding the substrate 200 around a cylindrical form 280 used in the construction of a multi-layer, multi-coil configuration for use in a gyroscope or the like. Only three wraps of the substrate are shown in FIG. 10. After 15 or 20, such wraps may be wound around the core to form the multi-coil configuration in accordance with the invention. A wall of radially increasing thickness 282 is disposed external to the core. The wall has a thickness at least equal to the thickness of the substrate and conductors disposed on both sides of the substrate. This provides a starting point for winding the substrate around the core in an essentially a spiral fashion. A first 90° section 284 of the substrate incorporates two nested circuits, e.g., circuits 1A and 1B shown in FIG. 4, on opposing sides of the substrate. A second 90° section 285 of the substrate 200 includes a further pair of nested circuits, e.g., 2A, 2B of FIG. 4. Similarly, third and fourth sections 286, 287 may correspond to the section of the substrate incorporating nested circuits 3A, 3B and 4A, 4B, respectively of FIG. 4. For the sake of simplicity, the drawing of FIG. 10 does not show the nesting between circuits of adjacent layers but serves to illustrate the forming of the cylinder. In the configuration of FIG. 10, the opposing sections 284 and 286 may be considered to correspond to opposing torquer coils along the x axes in the configuration of FIG. 1. Similarly, sections 285, 287 of FIG. 10 may be considered as corresponding to opposing torquer coils along the y axes, extending perpendicular to the x axes. It will be apparent from the description in connection with FIG. 8 and FIG. 10 that each additional turn of the substrate 200 with nested circuits disposed on both sides thereof will add circuit layers to each of the x and y torquer coils. After the coils have been completely formed by winding of the substrate around the core 280, the entire unit is encapsulated in a resin to maintain the substrate in the desired form and position. The unit may then be removed from the core 280 and installed in a gyroscope in a configuration similar to that of torquer coils 120, 121, shown in FIG. 1.

What is claimed is:

1. An electromagnetic coil assembly comprising:

a longitudinally extending flexible substrate formed into a cylindrical form having a plurality of layers and an exterior circumferential length and a central axis;

a plurality of spiral coil electrical conductor sections disposed on the substrate and spaced apart by a distance equivalent to one quarter of the exterior circumferential length to form two pairs of opposing coils, each spiral coil conductor section having a plurality of spaced apart turns and a center and a central electrical connection terminal adjacent the center and an exterior terminal end and an exterior electrical connection terminal adjacent the exterior terminal end;

wherein a first spiral coil electrical conductor section on a one side of a first layer is disposed in register with a second spiral coil electrical conductor section on one side of second layer disposed adjacent the one side of the first layer and wherein spaced apart turns of the second spiral coil electrical conductor section are nested between spaced apart turns of the first spiral coil electrical conductor section.

2. The coil assembly in accordance with claim 1 wherein the substrate comprises opposite sides and the assembly further comprises a first set of the spiral coil electrical conductor sections on one of the opposites sides of the substrate and a second set of the spiral coil electrical conductor sections on another of the opposite sides of the substrate and wherein each of the electrical conductor sections of the second set is disposed in register with an electrical conductor section of the first set and each pair of electrical conductor sections disposed in register forms two adjacent layers of a coil.

3. The coil assembly in accordance with claim 2 wherein the central electrical connection terminals of a pair of the electrical conductor sections disposed in register is electrically interconnected through the substrate.

4. The coil assembly in accordance with claim 1 wherein the longitudinally extending substrate is formed into a cylindrical form comprising a plurality of layers of the substrate and wherein each layer comprises four of the spiral coil electrical conductor sections.

5. The coil assembly in accordance with claim 4 wherein the substrate comprises opposite sides and wherein a layer of the substrate further comprises a first set of the spiral coil electrical conductor sections on one of the opposites sides of the substrate and a second set of the spiral coil electrical conductor sections on another of the opposite sides of the substrate and wherein each of the spiral coil electrical conductor sections of the second set is disposed in register with a spiral coil electrical conductor section of the first set and each pair of electrical conductors disposed in register form two adjacent layers of a coil.

6. The coil assembly in accordance with claim 5 wherein the central electrical connection terminals of a pair of electrical spiral coil conductor sections disposed in register on opposite sides of the substrate are electrically interconnected through the substrate.

7. The coil assembly in accordance with claim 6 wherein exterior electrical connection terminal of a selected spiral coil electrical conductor section on one side of one layer of the substrate is electrically connected to the exterior electrical connection terminal of a spiral coil electrical conductor section disposed on an adjacent layer of the substrate disposed in register with the selected spiral coil electrical conductor section.

8. The coil assembly in accordance with claim 5 wherein a first spiral coil conductor section on one side of a first layer of the substrate is disposed in register with a second spiral conductor section on other side of a second adjacent layer of the substrate and wherein adjacent turns of the first section are spaced apart and adjacent turns of the second conductor section are spaced apart and formed to be fitted between adjacent turns of the first spiral coil conductor section.

9. The coil assembly in accordance with claim 1 wherein the spiral coil electrical conductor sections each comprise a plurality of turns and each turn comprises logitudenally extending and substantially straight conductor sections joined at substantially right angles.

* * * * *

UNITED STATES PATENT AND TRADEMARK OFFICE
CERTIFICATE OF CORRECTION

PATENT NO. : 6,144,281
DATED : Nov. 7, 2000
INVENTOR(S) : LORRIS, MARK S.,

It is certified that error appears in the above-identified patent and that said Letters Patent is hereby corrected as shown below:

Col. 6, line 3; Claim 2, line 4:
  delete "opposites" and substitute therefor --opposite--
Col. 6, line 41; Claim 2, line 11:
  delete "a coil" and substitute therefor --one of said coils--
Col. 6, line 54; Claim 5, line 4:
  delete "opposites" and substitute therefor --opposite--
Col. 8, line 6; Claim9, line 3:
  delete "logitudenally" and substitute therefor --longitudinally--

Signed and Sealed this

Twenty-ninth Day of May, 2001

Attest:

NICHOLAS P. GODICI

*Attesting Officer*       *Acting Director of the United States Patent and Trademark Office*